No. 891,509. PATENTED JUNE 23, 1908.
D. N. TANNER.
BLACKSMITH AND MACHINIST TONGS.
APPLICATION FILED AUG. 7, 1907.

Witnesses:
H. E. High
Will Kelly Sheriff

Inventor:
Daniel Noah Tanner

UNITED STATES PATENT OFFICE.

DANIEL N. TANNER, OF TUPELO, MISSISSIPPI.

BLACKSMITH AND MACHINIST TONGS.

No. 891,509.  Specification of Letters Patent.  Patented June 23, 1908.

Application filed August 7, 1907. Serial No. 387,563.

*To all whom it may concern:*

Be it known that I, DANIEL N. TANNER, a citizen of the United States, residing at Tupelo, Mississippi, in the county of Lee, have invented new and useful Blacksmith and Machinist Tongs, of which the following is a specification.

This invention relates to improvements in tongs and comprises a plurality of gripping members arranged to firmly grip and hold various shaped bars or pipe to prevent the same from turning.

The invention further comprises the production of jaws pivotally secured together and arranged with diverging lips or gripping members in order to provide a plurality of contact points for gripping and firmly holding any object in the jaws.

The object in view is the production of tongs that are designed to firmly grip any desired object to prevent any turning of the object while so gripped.

Another object in view is the provision of means that will engage and hold from turning both round and square objects with equal ease.

With these and other objects in view the invention comprises certain novel constructions, combination and arrangement in parts that will be hereinafter more fully described and claimed.

Figure 1:
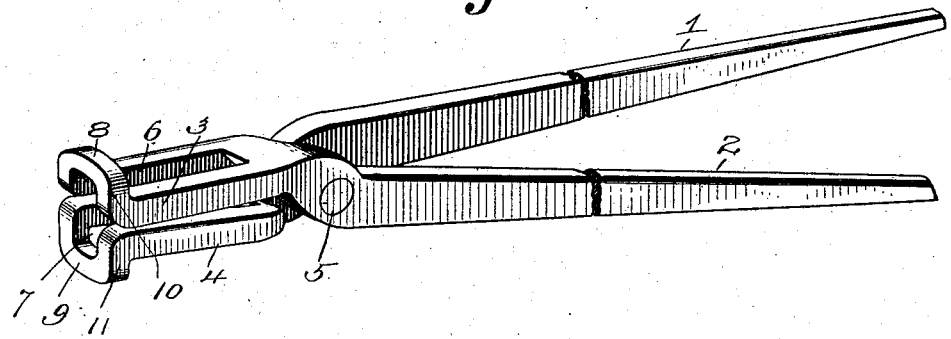
Figure 2:
Figure 5:
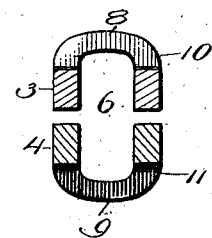
Figure 3:
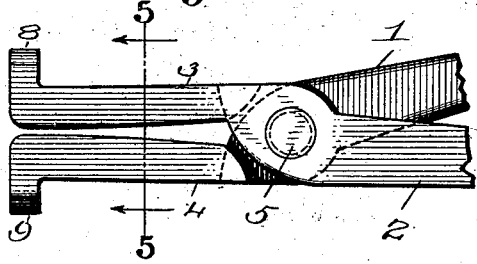
Figure 4:
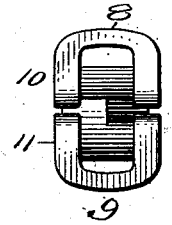

In the accompanying drawings: Figure 1 is a perspective view of my improved tongs. Fig. 2 is a top plan view of my improved tongs, the handles being broken away. Fig. 3 is a side elevation of Fig. 2. Fig. 4 is an end view of Fig. 3. Fig. 5 is a section through Fig. 3 on line 5—5, looking in the direction of the arrow.

In constructing tongs for gripping various articles as, for instance, tools, bars, pipes and the like, it is desirable to provide tongs that will firmly grasp the article without marring the same, and firmly hold the grasped article against any movement.

It is among the objects of the present invention to attain these results and to provide tongs that are designed to grasp with equal facility round and square articles and to hold the same against movement while so grasped.

Referring more particularly to the drawing 1 and 2 indicates handles of my improved tongs, and 3 and 4 the gripping jaws or members. The jaw 3 and handle 2 is made in one piece and jaw 4 and handle 1 is also made in one piece, the jaws being pivotally secured together by a rivet or bolt 5. The rivet or bolt 5 is preferably made of substantial size so as to form a good bearing to withstand any pressure that may be desired to be used in grasping articles between the jaws 3 and 4. The jaws 3 and 4 are formed with hollowed out portions 6 and 7 that extend from near the pivot 5 to near the outer end of the jaws but falling short thereof. By this construction each of the jaws are formed with what might be termed side members or bars that are connected by end pieces or members 8 and 9 respectively. The outer ends of the jaws 4 and 5 are bent up at 10 and 11 and being connected by bars 8 and 9 forming an oblong opening or mouth between jaws 3 and 4 when the same are closed as clearly seen in Figs. 1 and 4. By this construction when a flat piece of iron as, for instance, a flat file, is designed to be held by the jaws the same is placed between members 8 and 9 and when grasped thereby will be firmly held in position as the side bars of the jaws 3 and 4 will not permit any turning or twisting of the file. In case a round article should be placed in the tongs as, for instance, a drill that is designed to be sharpened or a round file or other article the same will be grasped by the inner corners or edges of the side bars formed from members 3 and 4. In this way a round article is grasped in four places and held against turning or any movement, and flat or square articles are easily grasped and prevented from turning by the sides of the jaws 3 and 4 or cross bars 8 and 9.

What I claim is:

1. In a device of the class described, a pair of gripping jaws, each provided with a longitudinal central slot extending therethrough, the ends of said jaws being deflected outwardly at right angles to the main portion thereof, and handles for said jaws.

2. In a device of the class described, a pair of gripping jaws, offset supplementary gripping devices formed on the ends of said jaws, the gripping surfaces of said devices falling without the plane of the gripping surfaces of the jaws proper, and handles for said jaws.

D. N. TANNER.

Witnesses:
 WILL KELLY,
 E. G. HODGES.